(12) United States Patent
Shin et al.

(10) Patent No.: US 9,739,222 B2
(45) Date of Patent: Aug. 22, 2017

(54) SYSTEM AND METHOD FOR CONTROLLING TORQUE INTERVENTION OF HYBRID ELECTRIC VEHICLE DURING SHIFT

(71) Applicant: HYUNDAI MOTOR COMPANY, Seoul (KR)

(72) Inventors: Dong Jun Shin, Hwaseong-si (KR); Jee Wook Huh, Bucheon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/957,572

(22) Filed: Dec. 2, 2015

(65) Prior Publication Data
US 2017/0074186 A1   Mar. 16, 2017

(30) Foreign Application Priority Data
Sep. 10, 2015 (KR) .................. 10-2015-0128182

(51) Int. Cl.
| B60L 9/00 | (2006.01) |
| F02D 41/02 | (2006.01) |
| B60W 20/15 | (2016.01) |
| B60W 30/19 | (2012.01) |

(52) U.S. Cl.
CPC .......... *F02D 41/023* (2013.01); *B60W 20/15* (2016.01); *B60W 30/19* (2013.01); *F02D 2250/26* (2013.01)

(58) Field of Classification Search
CPC .......... B60W 20/00; B60W 30/18; B60K 6/36
USPC ................... 701/22; 180/65.265; 903/945
See application file for complete search history.

(56) References Cited

U.S. PATENT DOCUMENTS

| 8,795,131 B2 | 8/2014 | Yamazaki et al. |
| 2013/0296123 A1* | 11/2013 | Doering ............... B60W 10/02 477/5 |

FOREIGN PATENT DOCUMENTS

| JP | 2010-083199 A | 4/2010 |
| JP | 2010-167803 A | 8/2010 |
| KR | 10-0829311 B1 | 5/2008 |
| KR | 10-2010-0056942 A | 5/2010 |
| KR | 10-2014-0005545 A | 1/2014 |
| KR | 10-1500245 B1 | 3/2015 |

* cited by examiner

*Primary Examiner* — Gertrude Arthur Jeanglaude
(74) *Attorney, Agent, or Firm* — McDermott Will & Emery LLP

(57) ABSTRACT

A method for controlling torque intervention of a hybrid electric vehicle during a shift includes judging whether or not torque intervention control is necessary, determining a torque intervention demand according to states of a motor and an HSG, upon judging that torque intervention control is necessary, and executing torque intervention control by HSG and motor torque reduction amounts under the condition that engine torque is maximally maintained based on the determined torque intervention demand.

12 Claims, 5 Drawing Sheets

--PRIOR ART--

SYSTEM AND METHOD FOR CONTROLLING TORQUE INTERVENTION OF HYBRID ELECTRIC VEHICLE DURING SHIFT

CROSS-REFERENCE TO RELATED APPLICATION

This application claims under 35 U.S.C. §119(a) the benefit of priority to Korean Patent Application No. 10-2015-0128182 filed on Sep. 10, 2015 with the Korean Intellectual Property Office, the entire contents of which are incorporated herein by reference.

TECHNICAL FIELD

The present disclosure relates to a system and method for controlling torque intervention of a hybrid electric vehicle during a shift. More particularly, it relates to a system and method for controlling torque intervention of a hybrid electric vehicle in which transmission input torque may be reduced so as to remove a sense of difference caused by a shift and shift shock.

BACKGROUND

Among green vehicles, hybrid electric vehicles and plug-in hybrid electric vehicles employ a motor as well as an engine as power sources to reduce exhaust gas and to improve fuel efficiency, and have a power transmission system which separately transmits power of the engine or the motor to drive wheels, or transmits power of both the engine and the motor to the drive wheels.

An exemplary power transmission system for hybrid electric vehicles includes, as exemplarily shown in FIG. 1, an engine 10 and a motor 12 disposed in series, an engine clutch 13 disposed between the engine 10 and the motor 12 to transmit or interrupt power of the engine 10, a transmission 14 to shift and transmit power of the motor 12 or both power of the motor 12 and power of the engine 10 to drive wheels and then to output the power, a hybrid starter generator (HSG) 16 which is a kind of motor connected to a crank pulley of the engine 10 so as to transmit power and generate electricity to start the engine 10 and recharge a battery, an inverter 18 to control the motor 12 and to control electricity generation, and the rechargeable high voltage battery 20 connected to the inverter 18 so as to provide electricity to the motor 12.

Such a power transmission system for hybrid electric vehicles, in which the motor 12 is mounted close to the auto transmission 14, is referred to as a transmission mounted electric device (TMED) type and provides driving modes such as an electric vehicle (EV) mode only for electric vehicles in which only power of the motor 12 is used, a hybrid electric vehicle (HEV) mode in which the engine 10 is used as a main power source and the motor 12 is used as an subsidiary power source, and a regenerative braking (RB) mode in which, when the vehicle is braked or is driven using inertia, the braking and inertia energy of the vehicle is recovered through power generation of the motor 12 and thus recharges the battery 20.

With reference to FIG. 2, if transmission input torque input from the engine 10 and/or the motor 12 is constant, transmission output torque is changed due to clutch connection or separation during a shift and, thus, a driver feels a sense of difference caused by a shift or shift shock.

Therefore, during a shifting process of a hybrid electric vehicle, a sense of difference generated at shift is minimized through optimal slip control of a clutch within a transmission and a brake using a fluid (a transmission oil), and, in order to reduce shock generated when the clutch is connected to or separated from the inside of the transmission during the shifting process, torque intervention control to momentarily reduce transmission input torque is applied, as exemplarily shown in FIG. 2.

In such torque intervention control, a subject of torque reduction to reduce transmission input torque is an engine, a motor, or both an engine and a motor.

However, if the subject of torque reduction is both the engine and the motor, torque intervention control is carried out in a situation in which battery charging is partially restricted or a situation in which motor torque control is insufficient and torque control responsiveness is lowered, as compared to the case where the subject of torque reduction is the motor, and there is a difficulty in properly distributing torque to the engine and the motor.

Further, when engine torque for torque intervention control is reduced, a change of the ignition angle of the engine to correspond to rapid torque change causes a lowering of efficiency of the engine and lowers fuel efficiency.

SUMMARY OF THE DISCLOSURE

The present disclosure has been made in an effort to solve the above-described problems associated with the prior art and it is an object of the present disclosure to provide a system and method for controlling torque intervention of a hybrid electric vehicle at shift in which, during torque intervention control, engine torque is maximally maintained, and torque intervention control by HSG and motor torques is carried out through optimal torque distribution in consideration of efficiencies of the HSG and the motor so as to promote fuel efficiency improvement.

In one aspect, the present disclosure provides a method for controlling torque intervention of a hybrid electric vehicle at shift, the method including judging whether or not torque intervention control is necessary, determining a torque intervention demand according to states of a motor and an HSG, upon judging that torque intervention control is necessary, and executing torque intervention control by HSG and motor torque reduction amounts under the condition that engine torque is maximally maintained based on the determined torque intervention demand.

In a preferred embodiment, if motor and HSG torque control may not be executed, an engine torque reduction amount may be determined as the torque intervention demand.

In another preferred embodiment, if motor and HSG torque control may be executed and the current driving mode of the hybrid electric vehicle is the EV mode, the motor torque reduction amount may be determined as the torque intervention demand.

In still another preferred embodiment, if motor and HSG torque control may be executed, the current driving mode of the hybrid electric vehicle is the HEV mode, and the torque intervention demand is greater than the sum of motor charging restriction torque and HSG charging restriction torque, the sum of an engine torque reduction amount, the motor charging restriction torque and the HSG charging restriction torque may be determined as the torque intervention demand.

In yet another preferred embodiment, if motor and HSG torque control may be executed, the current driving mode of the hybrid electric vehicle is the HEV mode, and the torque intervention demand is less than the sum of motor charging restriction torque and HSG charging restriction torque, the sum of the maintained engine torque, the motor torque reduction amount and the HSG torque reduction amount may be determined as the torque intervention demand.

In still yet another preferred embodiment, the motor torque reduction amount and the HSG torque reduction amount may be determined by optimal torque distribution in consideration of efficiencies of the HSG and the motor.

In one aspect, the present disclosure provides a system for controlling torque intervention of a hybrid electric vehicle at shift, the system including a torque intervention control judgment unit configured to judge whether or not torque intervention control is necessary, a torque intervention demand determination unit configured to determine a torque intervention demand according to states of a motor and an HSG, upon judging that torque intervention control is necessary, and a torque intervention controller configured to execute torque intervention control by HSG and motor torque reduction amounts under the condition that engine torque is maximally maintained based on the determined torque intervention demand.

Other aspects and preferred embodiments of the disclosure are discussed infra.

The above and other features of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawings.

DETAILED DESCRIPTION

Hereinafter reference will now be made in detail to various embodiments of the present disclosure, examples of which are illustrated in the accompanying drawings and described below. While the disclosure will be described in conjunction with exemplary embodiments, it will be understood that the present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

Hardware to control torque of a hybrid electric vehicle may include a hybrid control unit (HCU) of the hybrid electric vehicle, an engine control unit (ECU) to control engine torque according to torque instructions from the HCU, a motor control unit to control HSG and motor torque according to torque instructions from the HCU, and a shift control unit to execute shift-related control.

In accordance with the present disclosure, the HCU may include a torque intervention control judgment unit to judge whether or not torque intervention control is necessary, a torque intervention demand determination unit to determine a torque intervention demand according to motor and HSG states upon judging that torque intervention control is necessary, and a torque intervention controller to execute a torque intervention control according to HSG and motor torque reduction amounts under the condition that engine torque is maximally maintained based on the determined torque intervention demand.

Figure 1:
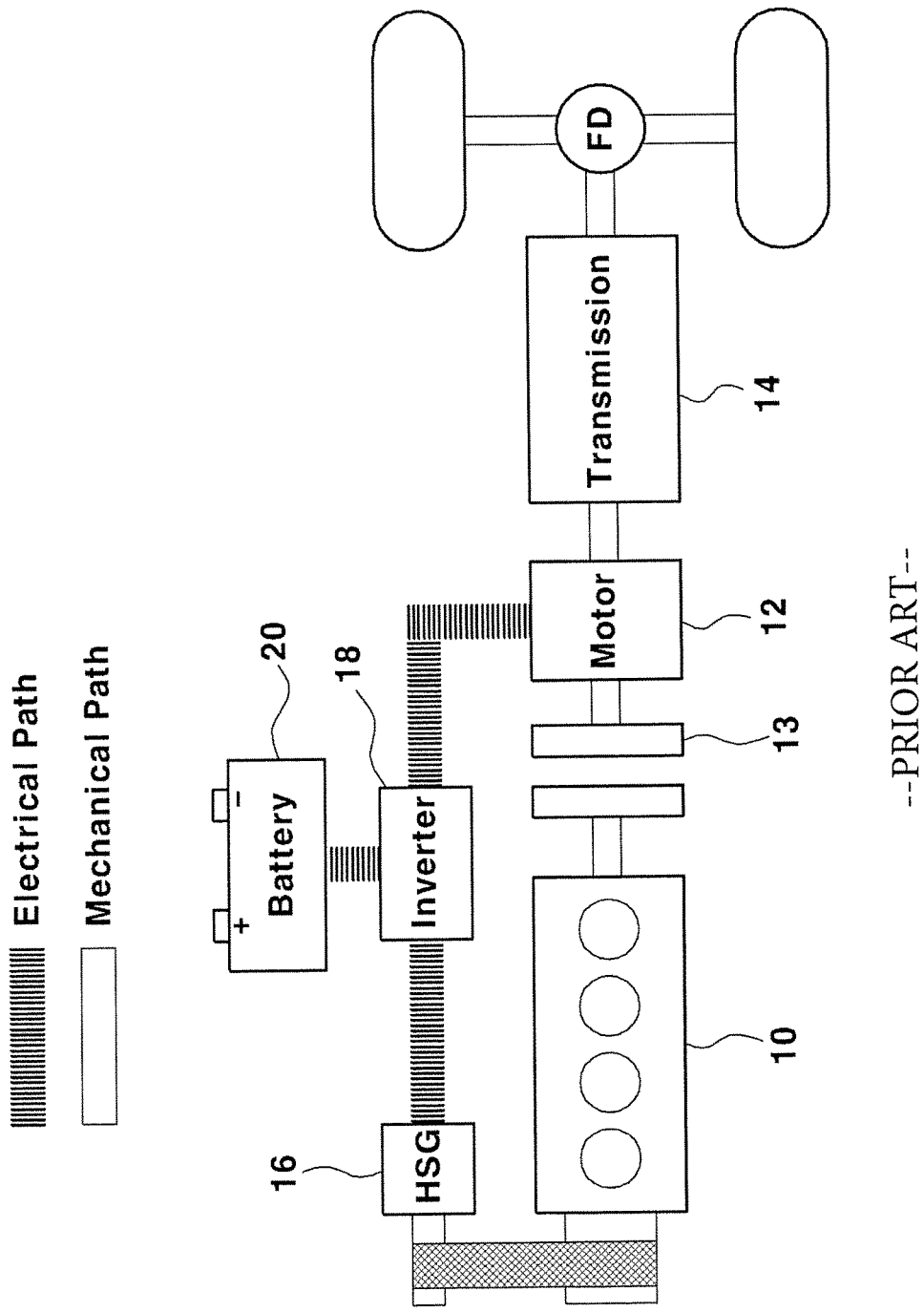
FIG. 1 is a view illustrating a configuration of an exemplary power transmission system for hybrid electric vehicles.
Figure 2:
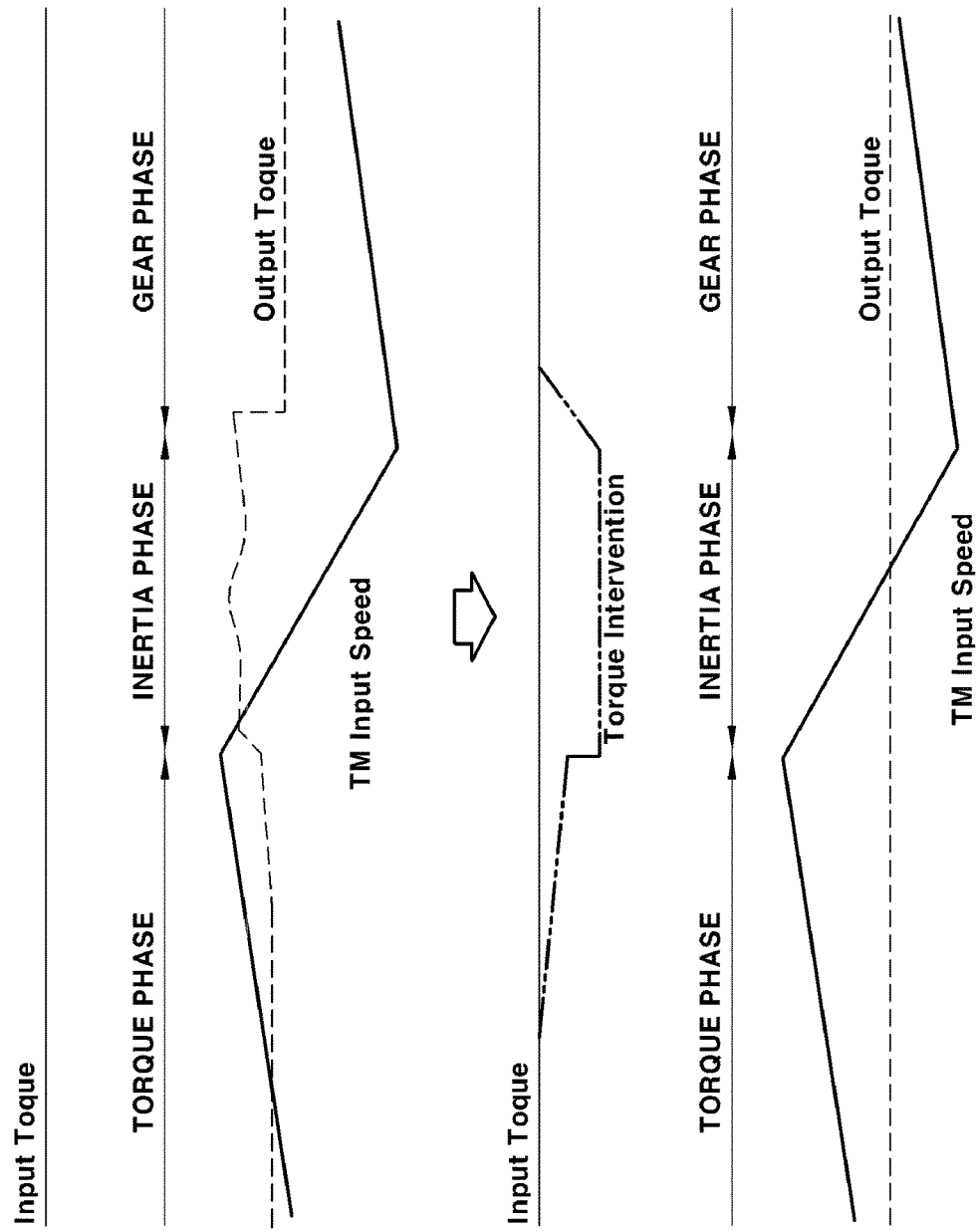
FIG. 2 is a graph illustrating the concept of torque intervention control.
Figure 3:
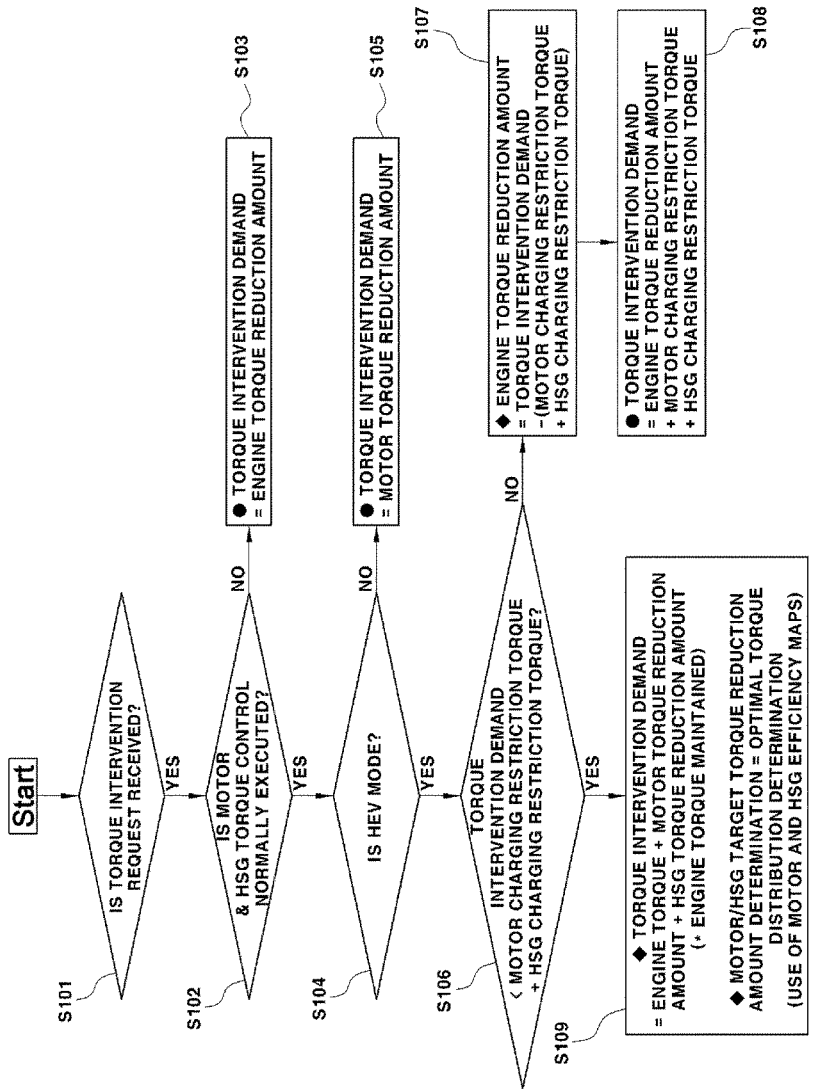
FIG. 3 is a flowchart illustrating a method for controlling torque intervention of a hybrid electric vehicle during a shift in accordance with the present disclosure.

FIG. 3 is a flowchart illustrating a method for controlling torque intervention of a hybrid electric vehicle during a shift in accordance with the present disclosure.

First, the torque intervention control judgment unit judges whether or not torque intervention control is necessary (Operation S101).

That is, when the shift control unit of the hybrid electric vehicle transmits a signal indicating that shift is underway to the HCU, the HCU judges that torque intervention control is necessary.

Thereafter, whether or not motor and HSG torque control may be normally executed is judged (Operation S102).

As a result of judgment, upon judging that motor and HSG torque control may not be normally executed due to an error or failure of the motor control unit, a subject of torque reduction to execute torque intervention control becomes an engine.

That is, in a situation in which motor torque control is impossible or charging of a battery by the HSG is restricted, a subject of torque reduction to execute torque intervention control becomes the engine.

Therefore, if motor and HSG torque control may not be normally executed under the condition that torque intervention control is necessary, the torque intervention demand determination unit determines a torque intervention demand according to an engine torque reduction amount (Operation S103) and, when the HCU transmits instructions indicating the determined engine torque reduction amount to the engine control unit, torque intervention control based on the determined engine torque reduction amount is executed.

Here, if a subject of torque reduction to execute torque intervention control is the engine, fuel efficiency may be lowered due to a decrease in ignition efficiency to rapidly follow torque.

Thereafter, if motor and HSG torque control may be normally executed, the current driving mode of the hybrid electric vehicle is judged (Operation S104).

As a result of judgment, if the current driving mode of the hybrid electric vehicle is the EV mode, engine torque is not input to a transmission and, thus, a subject of torque reduction to execute torque intervention control becomes the motor.

Therefore, if motor and HSG torque control may be normally executed under the condition that torque intervention control is necessary and the current driving mode is the EV mode, the torque intervention demand determination unit determines the torque intervention demand according to a motor torque reduction amount (Operation S105) and, when the torque intervention controller of the HCU transmits instructions indicating the determined motor torque reduction amount to the motor control unit, torque intervention control based on the determined motor torque reduction amount is executed.

Thereafter, if motor and HSG torque control may be normally executed and the current driving mode of the hybrid electric vehicle is judged as the HEV mode, the torque intervention demand is compared with the sum of motor charging restriction torque and HSG charging restriction torque (Operation S106).

As a result of comparison, if the torque intervention demand is greater than the sum of motor charging restriction torque and HSG charging restriction torque, a torque intervention demand corresponding to an excess over the sum of motor charging restriction torque and HSG charging restriction torque is recovered by an engine torque reduction amount.

Here, the engine torque reduction amount is determined as torque intervention demand−(motor charging restriction torque+HSG charging restriction torque) (Operation S107).

Therefore, if motor and HSG torque control may be normally executed under the condition that torque intervention control is necessary, the current driving mode is the HEV mode, and the torque intervention demand exceeds the sum of motor charging restriction torque and HSG charging restriction torque, the torque intervention demand determination unit determines [engine torque reduction amount+motor charging restriction torque+HSG charging restriction torque] as the torque intervention demand (Operation S108) and, when the torque intervention demand determination unit of the HCU transmits instructions indicating the determined torque intervention demand to the engine control unit and the motor control unit, torque intervention control based on the determined torque intervention demand is executed.

On the other hand, if the torque intervention demand is less than the sum of motor charging restriction torque and HSG charging restriction torque, motor or HSG driving torque is in a state of exceeding the charging amount of the battery (i.e., a state of being capable of applying a negative (−) torque value to the motor or HSG driving torque) and, thus, the torque intervention demand may be determined without a reduction in engine torque.

Therefore, if motor and HSG torque control may be normally executed under the condition that torque intervention control is necessary, the current driving mode is the HEV mode, and the torque intervention demand is less than the sum of motor charging restriction torque and HSG charging restriction torque, the torque intervention demand determination unit determines the sum of the engine torque (maintained), the motor torque reduction amount and the HSG torque reduction amount as the torque intervention demand (Operation S109).

Figure 4:
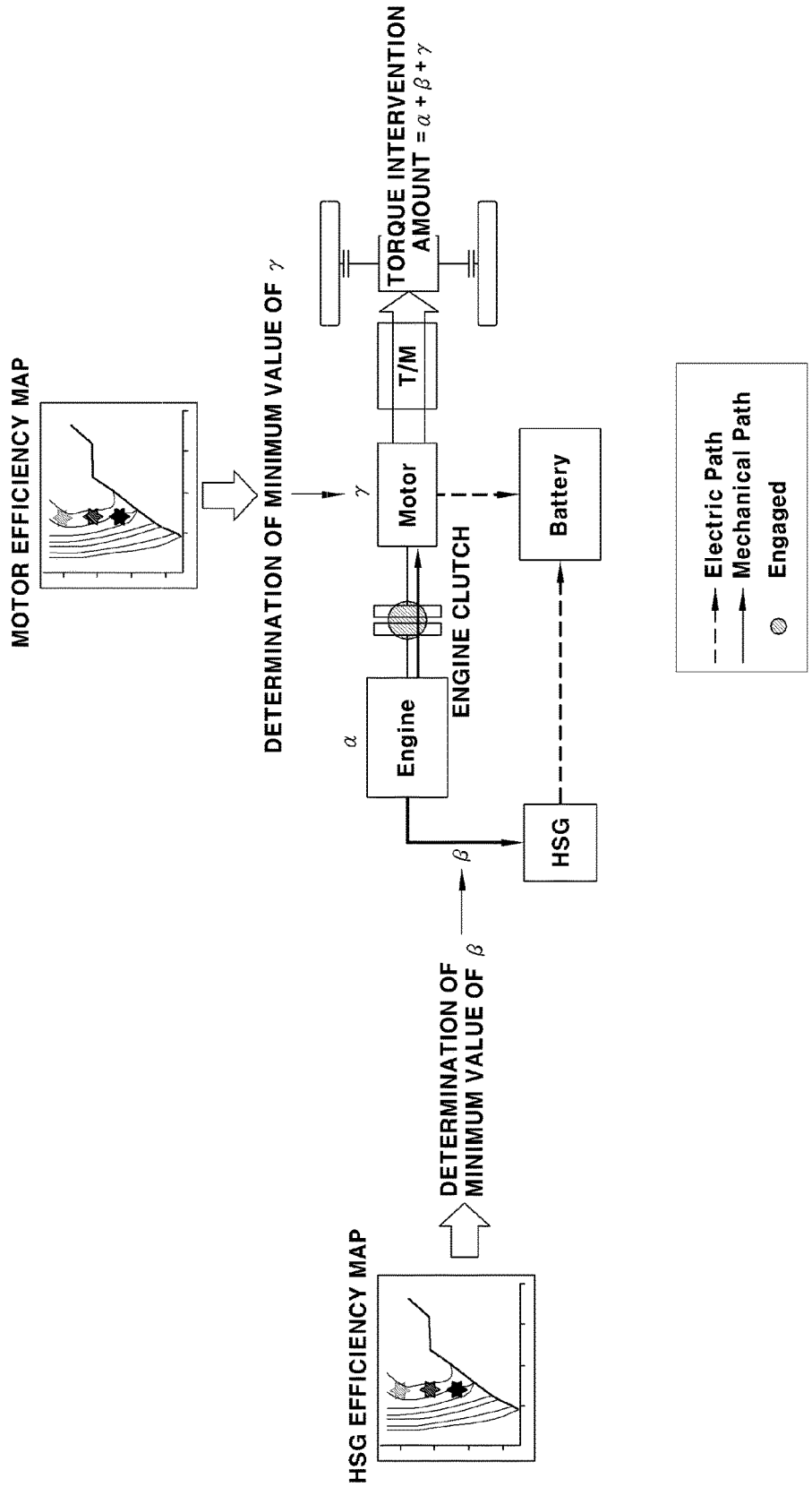
FIG. 4 is a block diagram of a power transmission system to which torque intervention control of a hybrid electric vehicle during a shift in accordance with the present disclosure is applied, illustrating an example of determination of reduction amounts of motor torque and HSG torque.

When the HCU transmits instructions indicating the torque intervention demand determined in Operation S109 to the engine control unit and the motor control unit, torque intervention control based on the determined torque intervention demand is executed, and torque intervention control is executed by HSG and motor torque reduction amount distribution while maintaining the engine torque, as exemplarily shown in FIG. 4.

As described above, transmission input torque may be the sum of engine torque, HSG torque and motor torque and, since torque intervention control during a shift is a request to reduce the transmission input torque to a target value, the transmission input torque follows the torque sum input to the transmission while the HSG torque is changed, as needed, so as to follow intervention target torque.

Figure 5:
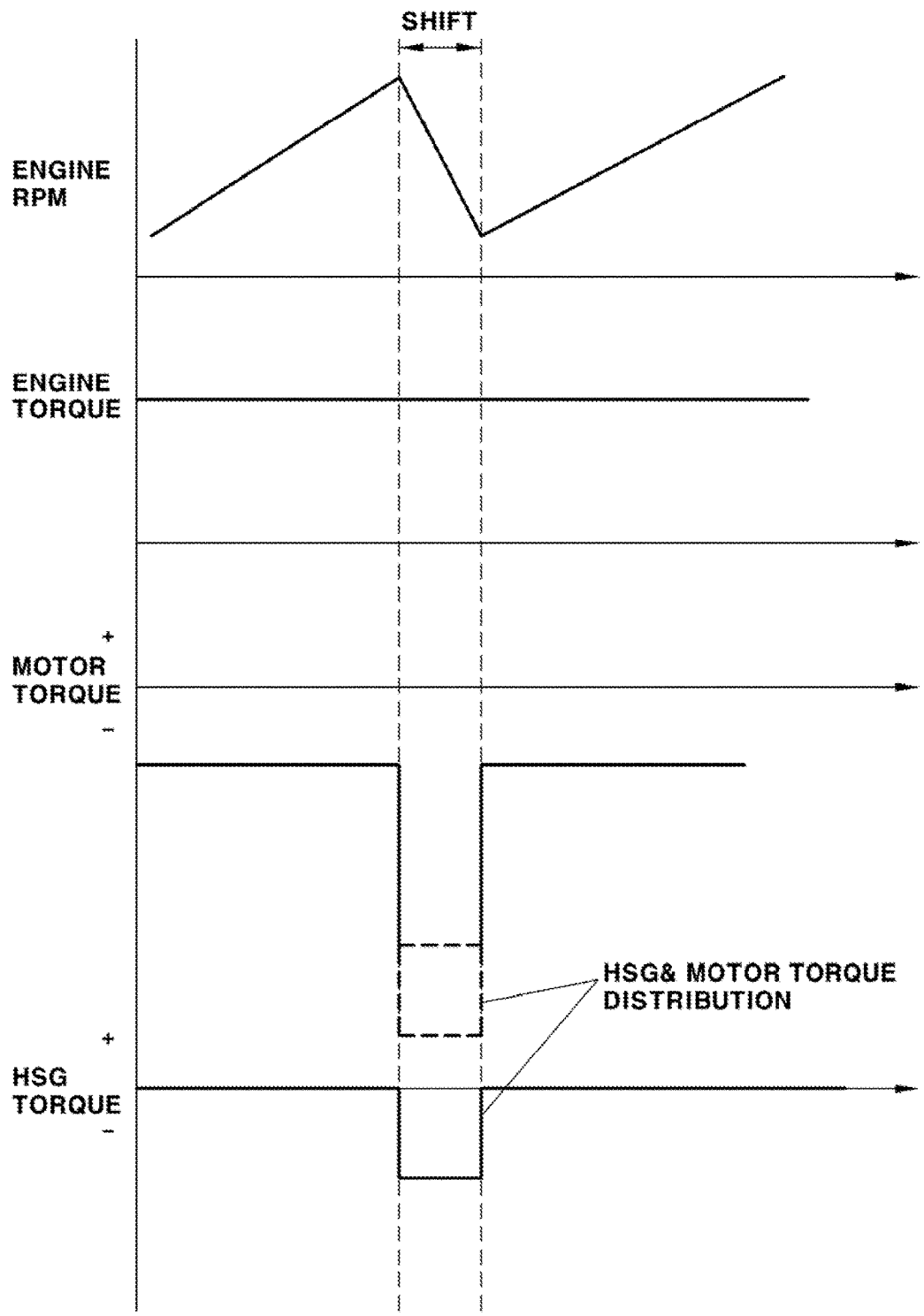
FIG. 5 is a graph illustrating a method for controlling torque intervention of a hybrid electric vehicle during a shift in accordance with the present disclosure.

With reference to FIG. 5, the motor torque reduction amount γ and the HSG torque reduction amount β may be determined by optimal torque distribution in consideration of HSG and motor efficiencies and, for this purpose, values extracted from a motor efficiency map and an HSG efficiency map may be used as the motor torque reduction amount γ and the HSG torque reduction amount β. Therefore, lowering of HSG and motor efficiencies during torque intervention control may be prevented.

As described above, the torque intervention demand is determined in consideration of the states of the motor and the HSG, the driving mode, the motor and HSG charging restriction torques, etc. and torque intervention control based on the HSG and motor torque reduction amounts is executed under the condition that engine torque is maximally maintained according to the determined torque intervention demand, thereby preventing a lowering of engine efficiency and improving fuel efficiency.

As is apparent from the above description, the present disclosure provides following effects.

First, when torque intervention control is executed during a shift of a hybrid electric vehicle, torque intervention control is executed based on HSG and motor torque reduction amounts under the condition that engine torque is maximally maintained, thereby preventing a lowering of engine efficiency and improving fuel efficiency.

Second, the HSG and motor torque reduction amounts for torque intervention control are determined through optimal torque distribution in consideration of efficiencies of an HSG and a motor, thereby preventing a lowering of both HSG efficiency and motor efficiency.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

What is claimed is:

1. A method for controlling torque intervention of a hybrid electric vehicle during a shift, comprising:
   judging, by a torque intervention control judgment unit, that torque intervention control is necessary;
   determining, by a torque intervention demand determination unit, a torque intervention demand according to states of a motor and an HSG, upon judging that torque intervention control is necessary; and
   executing, by a torque intervention controller, torque intervention control by HSG and motor torque reduction amounts under the condition that engine torque is maximally maintained based on the determined torque intervention demand.

2. The method of claim 1, wherein if motor and HSG torque control may not be executed, an engine torque reduction amount is determined as the torque intervention demand.

3. The method of claim 1, wherein if motor and HSG torque control may be executed and the current driving mode of the hybrid electric vehicle is the EV mode, the motor torque reduction amount is determined as the torque intervention demand.

4. The method of claim 1, wherein if motor and HSG torque control may be executed, the current driving mode of the hybrid electric vehicle is the HEV mode, and the torque intervention demand is greater than the sum of motor charging restriction torque and HSG charging restriction torque, the sum of an engine torque reduction amount, the motor charging restriction torque and the HSG charging restriction torque is determined as the torque intervention demand.

5. The method of claim 1, wherein if motor and HSG torque control may be executed, the current driving mode of the hybrid electric vehicle is the HEV mode, and the torque intervention demand is less than the sum of motor charging restriction torque and HSG charging restriction torque, the sum of the maintained engine torque, the motor torque reduction amount and the HSG torque reduction amount is determined as the torque intervention demand.

6. The method of claim 5, wherein the motor torque reduction amount and the HSG torque reduction amount are determined by optimal torque distribution in consideration of efficiencies of the HSG and the motor.

7. A system for controlling torque intervention of a hybrid electric vehicle during a shift, comprising:
a torque intervention control judgment unit for judging that torque intervention control is necessary;
a torque intervention demand determination unit for determining a torque intervention demand according to states of a motor and an HSG, upon judging that torque intervention control is necessary; and
a torque intervention controller for executing torque intervention control by HSG and motor torque reduction amounts under the condition that engine torque is maximally maintained based on the determined torque intervention demand.

8. The system of claim 7, wherein the torque intervention demand determination unit, if motor and HSG torque control may not be executed, determines an engine torque reduction amount as the torque intervention demand.

9. The system of claim 7, wherein the torque intervention demand determination unit, if motor and HSG torque control may be executed and the current driving mode of the hybrid electric vehicle is the EV mode, determines the motor torque reduction amount as the torque intervention demand.

10. The system of claim 7, wherein the torque intervention demand determination unit, if motor and HSG torque control may be executed, the current driving mode of the hybrid electric vehicle is the HEV mode, and the torque intervention demand is greater than the sum of motor charging restriction torque and HSG charging restriction torque, determines the sum of an engine torque reduction amount, the motor charging restriction torque and the HSG charging restriction torque as the torque intervention demand.

11. The system of claim 7, wherein the torque intervention demand determination unit, if motor and HSG torque control may be executed, the current driving mode of the hybrid electric vehicle is the HEV mode, and the torque intervention demand is less than the sum of motor charging restriction torque and HSG charging restriction torque, determines the sum of the maintained engine torque, the motor torque reduction amount and the HSG torque reduction amount as the torque intervention demand.

12. The system of claim 11, wherein the motor torque reduction amount and the HSG torque reduction amount are determined by optimal torque distribution in consideration of efficiencies of the HSG and the motor.

* * * * *